Jan. 16, 1968            J. S. CASE            3,363,482

POWER TRANSMISSION ARRANGEMENT

Filed July 19, 1965            3 Sheets-Sheet 1

INVENTOR.
John S. Case
BY
Walter J. Finch
ATTORNEY

Jan. 16, 1968          J. S. CASE          3,363,482
POWER TRANSMISSION ARRANGEMENT
Filed July 19, 1965          3 Sheets-Sheet 2
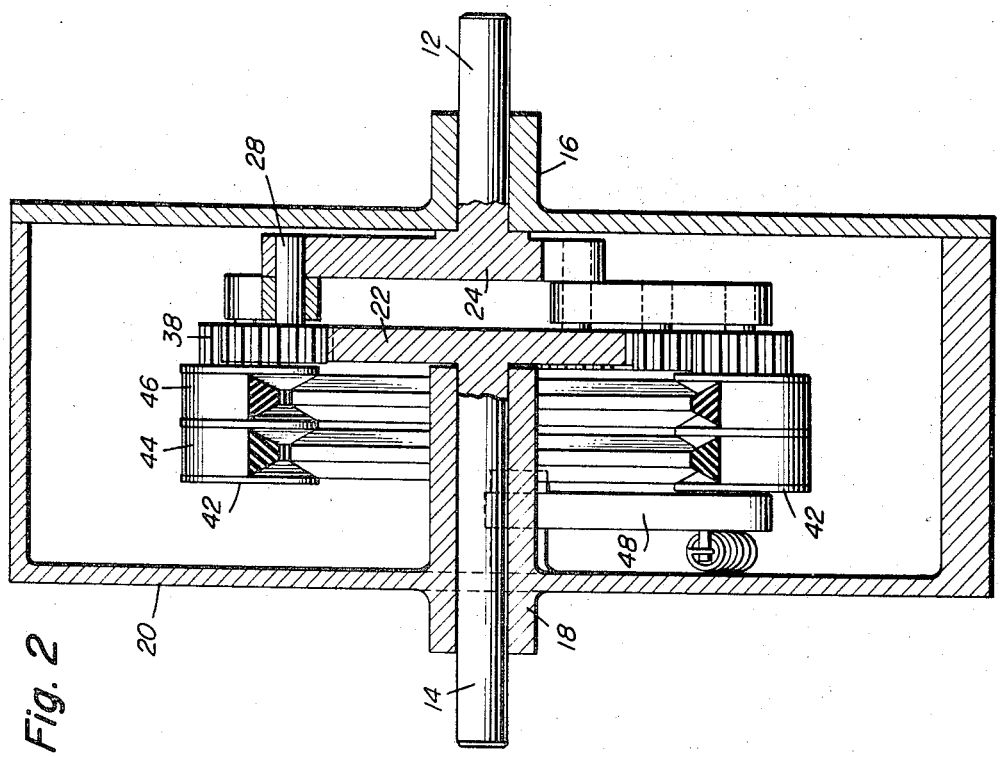
INVENTOR.
John S. Case
BY
Walter J. Finch
ATTORNEY Jan. 16, 1968  J. S. CASE  3,363,482
POWER TRANSMISSION ARRANGEMENT
Filed July 19, 1965  3 Sheets-Sheet 3

INVENTOR.
John S. Case
BY
Walter J. Finch
ATTORNEY 3,363,482
POWER TRANSMISSION ARRANGEMENT
John S. Case, 1150 Gypsy Lane E., Towson, Md. 21204
Filed July 19, 1965, Ser. No. 472,855
5 Claims. (Cl. 74—752)

ABSTRACT OF THE DISCLOSURE

A power transmission system is provided which is of the co-linear drive-and-driven shaft type and has intermediate planetary gearing. In the place of an outer or ring gear, a pair of endless belts are used having a common overlapped area defined by the orbiting elements. These elements are pivotally mounted on a spider so they can swing and thus change the orbit diameter. A swinging idler pulley for each belt absorbs or supplies the resulting change in belt configuration. One embodiment of the invention contemplates the automatic speed control resulting from centrifugal force of the orbiting elements expanding the overlap of the belting. Another embodiment contemplates manually controlling this loop area with lever elements to move the swing of the idler pulleys and change output speed. Still another embodiment of the invention involves controlling the speed and direction of the belts through control motor means transmitted through one idler pulley for a resulting output speed change of the transmission through zero and in reverse direction.

---

This invention relates generally to gearing devices and more particularly it pertains to a power transmission system of the planetary type.

It is an object of this invention to provide a speed responsive automatic ratio change transmission.

Another object of the invention is to provide a planetary transmission of either the gear or pulley type in which the speed ratio may be continuously varied through zero for an output in either direction.

Other objects and attendant advantages of this invention will become more readily apparent and understood from the following detailed specification and accompanying drawings in which:

FIG. 2 is a vertical section through the transmission taken on line 2—2 of FIG. 1;

FIG. 3 is a fragmentary detail view showing one of the swinging arm assemblies;

FIG. 4 is a modified arrangement of a swinging arm assembly;

Figure 1:
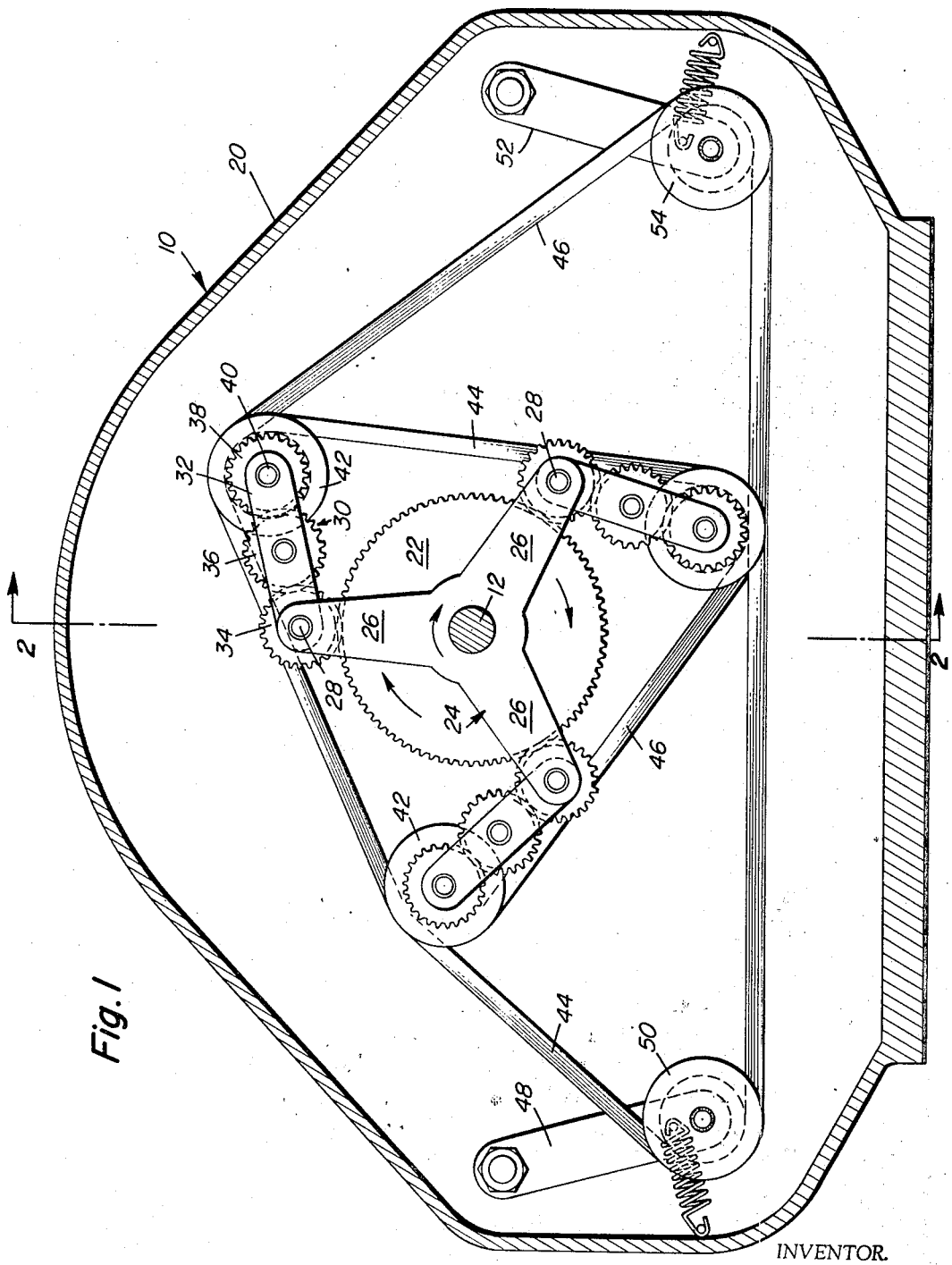
FIG. 1 is a side elevation of a power transmission system incorporating features of this invention.
Figure 5:
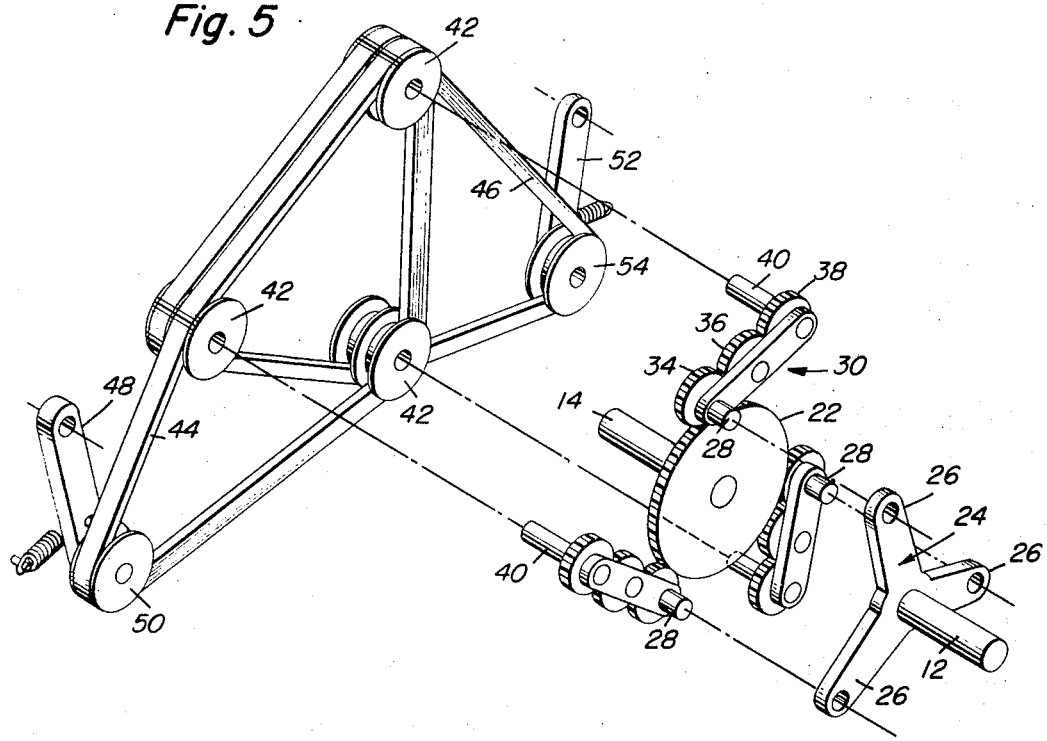
FIG. 5 is an exploded view of the elements of the transmission of FIG. 1.

Referring now to FIGS. 1, 2 and 5 of the drawings, the power transmission system 10 of this invention consists of an input shaft 12 and an output shaft 14 which are respectively mounted in journals 16 and 18 on opposite sides of a case 20 so as to be axially co-extensive. The case 20 is sealed tight, and the interior thereof contains an appropriate oil lubricant for the moving parts.

An output gear 22 is secured on the shaft 14 and a larger diameter three armed spider 24 is secured on the input shaft 12. Each leg 26 of the spider 24 carries an identical swing arm assembly 30 on stub shafts 28.

The swing arm assembly comprises an arm 32 and three meshed pinions 34, 36, and 38 are journaled thereto. The innermost pinion 34 is on the stub shaft 28 and additionally meshes with the output gear 22. The center pinion 34 is an idler in function.

The outermost pinion 38 is secured on a stub shaft 40 which is journaled in and extends from the arm 32. A double sheave 42 is secured to this stub shaft 40 and rotates with pinion 38.

The three double sheaves are constrained to travel in an orbit about the axis of shafts 12 and 14 by overlapped loops formed of two endless belts 44 and 46.

Belt 44 is tensioned to one side by a spring biased bracket 48 pivoted to the case 20 and sheave 50. Belt 46 is similarly tensioned by a spring biased bracket 52 and sheave 54.

Let it be considered that the sheaves 50 and 54 are staked to the brackets 48 and 52, respectively. The belts 44 and 46 then do not rotate. When a driving force rotates input shaft 12 (see arrows in FIG. 1), the spider 24 carries the swing arm assemblies 30 around so the double sheaves 42 travel inside the loops of belts 44 and 46. The stationary belts 44 and 46 force the double sheaves to rotate and this rotation is passed down the train of pinions 38, 36 and 34 to rotate the output gear 22 and useful output power may be taken from output shaft 14.

Torque and centrifugal forces in opposite direction will cause the swing arms to pull in or swing out, respectively. This causes a smaller (or larger) orbiting loop of the belts 44 and 46. A small loop of the belts 44 and 46 is traversed in fewer turns of the double sheaves 42 and so the speed of output shaft 14 will be low.

A long loop results in a high output speed. Thus, the transmission arrangement adjusts the speed of output according to torque requirements.

In order to avoid a clash of the idler pinion 36 with the output gear 22, a lug 56 and stop 58 is arranged for the swinging arm assembly 30 as shown in FIG. 3.

The train of pinions 34, 36, 38 may optionally be replaced with a V-shaped belt 60 as shown in FIG. 4. The pinions 34 and 38 are replaced with mating V-shaped pulleys 62 and 64 for the belt 60.

Figure 6:
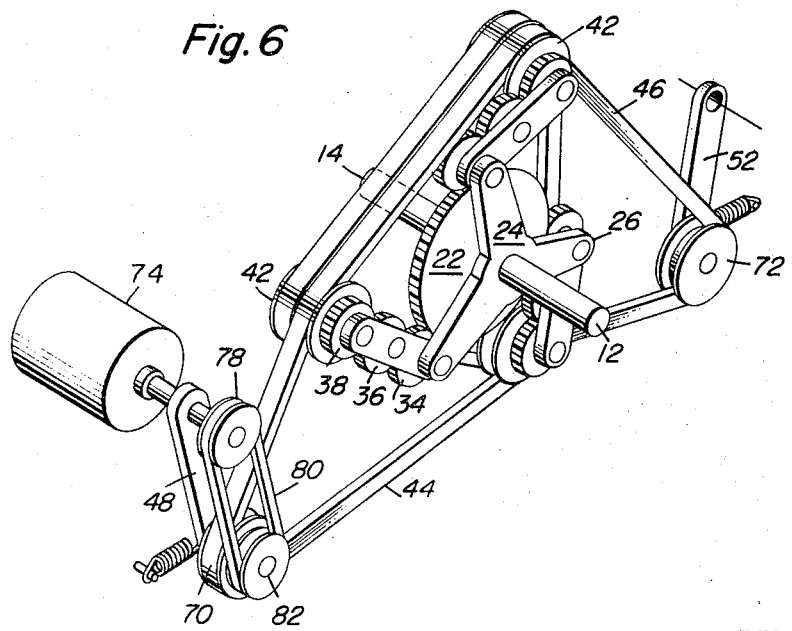
FIG. 6 is a perspective view of a modified form of the transmission arrangement.

In the modified embodiment of the invention as shown in FIG. 6 the sheaves 50 and 54 are replaced with sheaves 70 and 72 which are free to rotate. A variable speed motor 74 which may be operated in a forward or reverse direction or stopped is journaled through the axis of suspension 76 of the bracket 48. This motor has a pulley 78 and belt 80 which drive the sheave 70 by means of a pulley 82 integral therewith. Similarly the mated gears 22 and 34 can optionally be replaced with belted-together V-pulleys. The speed ratio between shafts 28 and 40 and/or 28 and 14 can be of any desired value to give the design result.

Now with the belts 44 and 46 non-stationary, the transmission of rotative force to the contacting double sheaves 42 may be varied in speed, reduced to zero, or reversed at will. The useful output from the output shaft 14 will correspondingly be varied in speed.

An adjustable orbiting loop of the belts 44 and 46 can be simply provided for supplemental manual control of speed by attaching an exterior hand lever or foot pedal (not shown), cross connected to brackets 48 and 52. Further, to improve the swing action of arm assemblies 30 at slow speeds or to change the relative rate of self-accommodation to speed changes in either direction there may be added suitable tension or torque springs (not shown) between the spider legs 26 and arms 32 to keep the sheaves 42 in firm contact with the belts 44 and 46. Another modification for manual control is to replace the variable speed motor 74 with a friction brake operated by a hand lever or foot pedal. The action is the same as with a running or stalled motor as previously related except that the free wheeling of sheaves 70 and 72 is self-induced by the belting.

Obviously many modifications and variations of the present invention are possible in light of the above teachings. It is, therefore, to be understood that within the scope of the appended claims the invention may be practiced otherwise than as specifically described.

What is claimed is:

1. A power transmission system, comprising a support, an input shaft rotatably mounted to said support and having a radially extending member mounted thereon, rotatable means mounted on said member and radially spaced from said input shaft, said rotatable means including inner and outer sheave elements positioned at equal radial and circumferential spacing about said radially extending member, an output shaft rotatably mounted to said support, inner and outer belt elements each having a section in operative engagement with their respective sheave elements to cause the rotation thereof during rotation of said input shaft and a section free of such engagement and extending substantially opposite from each other, with the first mentioned section of said belt elements forming with each other an annular path for said sheave elements, means increasing the length of said path in response to the speed of rotation of said input shaft, means biasing the length of said path to a reduction thereof, and means responsive to the rotation of said sheave elements to rotate said output shaft.

2. The power transmission system as recited in claim 1, and additionally, means for rotating said belt elements so as to rotate said sheave elements in conjunction with and independent of the rotation of said input shaft.

3. The power transmission system of claim 1 wherein a plurality of swing arms are pivotally mounted to said radially extending member and said sheave elements are rotatably mounted to their respective swing arms, and said responsive means includes elements rotatably mounted to said swing arms to rotate in response to the rotation of said sheave elements and structure mounted to said output shaft and in operative engagement with said rotatably mounted elements for translating the rotation thereof to rotation of said output shaft.

4. The power transmission of claim 3, wherein said rotatably mounted elements on each said swing arms consists of a plurality of gears in operative engagement.

5. A power transmission system comprising a support, an input shaft rotatably mounted to said support and having a radially extending member mounted thereon, a plurality of equally spaced swing arms pivotally and radially mounted to said radially extending member, rotatable elements mounted to each said swing arms, expansible belt means engaging said rotatable elements for rotating said elements upon rotation of said input shaft, with the speed of rotation of said elements being dependent on the degree of expansion of said belt means, an output shaft rotatably mounted to said support, means responsive to the rotation of said elements to rotate said output shaft, and means rotating said belt means independent of the rotation of said input shaft.

References Cited

UNITED STATES PATENTS

| | | | |
|---|---|---|---|
| 1,981,582 | 11/1934 | Colucci | 74—752 |
| 2,268,305 | 12/1941 | Reinhard | 74—675 |
| 2,299,247 | 10/1942 | Morgan | 74—798 X |
| 2,459,969 | 1/1949 | Schweickart | 74—793 |
| 2,815,685 | 12/1957 | Parrett | 74—798 |
| 2,939,345 | 6/1960 | Burns | 74—798 X |
| 3,015,972 | 1/1962 | Voigt | 74—640 X |
| 3,119,283 | 1/1964 | Bentov | 74—796 X |

FOREIGN PATENTS

| | | |
|---|---|---|
| 281,942 | 12/1927 | Great Britain. |
| 405,647 | 2/1934 | Great Britain. |
| 415,769 | 11/1946 | Italy. |

DONLEY J. STOCKING, *Primary Examiner.*

THOMAS C. PERRY, *Examiner.*

J. R. BENEFIEL, *Assistant Examiner.*